US008863391B2

(12) United States Patent
Bagley et al.

(10) Patent No.: US 8,863,391 B2
(45) Date of Patent: Oct. 21, 2014

(54) EGG SLICER

(75) Inventors: Justin Bagley, Seattle, WA (US); Jennifer K. Cotter, Seattle, WA (US); Lance L. Hood, Seattle, WA (US)

(73) Assignee: Progressive International Corporation, Kent, WA (US)

( * ) Notice: Subject to any disclaimer, the term of this patent is extended or adjusted under 35 U.S.C. 154(b) by 293 days.

(21) Appl. No.: 13/559,114

(22) Filed: Jul. 26, 2012

(65) Prior Publication Data

US 2013/0025130 A1 Jan. 31, 2013

Related U.S. Application Data

(60) Provisional application No. 61/512,057, filed on Jul. 27, 2011.

(51) Int. Cl.
*A21C 5/08* (2006.01)

(52) U.S. Cl.
USPC ............................................. 30/114; 30/353

(58) Field of Classification Search
USPC ................................................. 30/114, 353
See application file for complete search history.

(56) References Cited

U.S. PATENT DOCUMENTS

| | | | | |
|---|---|---|---|---|
| 3,800,649 | A * | 4/1974 | Chinn | 83/651.1 |
| 4,095,339 | A * | 6/1978 | Turner | 30/114 |
| 4,569,280 | A * | 2/1986 | D'Ambro et al. | 99/538 |
| 4,852,256 | A * | 8/1989 | Schoettler | 30/114 |
| 5,749,145 | A * | 5/1998 | Baukloh | 30/114 |
| D521,819 | S * | 5/2006 | So et al. | D7/673 |
| D568,117 | S | 5/2008 | Hauser | |
| 7,984,554 | B2 * | 7/2011 | Aby-Eva et al. | 30/116 |
| D649,413 | S * | 11/2011 | Coursey et al. | D7/673 |
| D650,247 | S * | 12/2011 | Harris et al. | D7/673 |
| D687,267 | S * | 8/2013 | Harris et al. | D7/673 |
| D690,170 | S * | 9/2013 | Harris et al. | D7/673 |
| 2002/0100173 | A1 * | 8/2002 | Suer et al. | 30/114 |
| 2006/0254058 | A1 * | 11/2006 | Chang | 30/114 |
| 2008/0168660 | A1 * | 7/2008 | Chiu | 30/114 |
| 2009/0193983 | A1 * | 8/2009 | So | 99/537 |
| 2009/0282990 | A1 * | 11/2009 | Farnum et al. | 99/537 |

FOREIGN PATENT DOCUMENTS

| | | |
|---|---|---|
| CN | 201389873 | 1/2010 |
| DE | 7130835 | 11/1976 |
| DE | 19625914 | 9/1997 |
| EP | 2090410 | 8/2009 |
| EP | 2151306 | 2/2010 |
| WO | 2009/012014 | 1/2009 |

* cited by examiner

*Primary Examiner* — Sean Michalski
(74) *Attorney, Agent, or Firm* — Lowe Graham Jones PLLC

(57) ABSTRACT

An egg slicer includes a base having a plurality of ribs for supporting a food item to be sliced. The cutting element formed with a frame and one or more blades extending across the frame may be pressed downward such that it slices through the food item and the one or more blades are received within channels formed between the ribs. Openings formed between sidewalls of the base serve as guides to ensure an axial path of travel of the cutting element. Several different arrangements of channels between the ribs allows for the accommodation of several corresponding different arrangements of blades.

18 Claims, 7 Drawing Sheets

EGG SLICER

PRIORITY CLAIM

This application claims the benefit of provisional application Ser. No. 61/512,057 filed Jul. 27, 2011, the contents of which are incorporated by reference.

FIELD OF THE INVENTION

This invention relates to kitchen tools, particularly including tools for slicing eggs and other soft foods such as mushrooms, kiwis, strawberries, and the like.

BACKGROUND OF THE INVENTION

Many food items are prepared by cutting them into slices, halves, or wedges. In each case, it can be difficult to make consistent cuts that produce uniform slices. While some have discovered that it is possible to create a wire grid for slicing soft items such as eggs, current wire grid-based slicing devices are provided in a single fixed configuration and therefore lack a desired versatility to allow them to be used for cutting items in half, preparing wedges, as well as uniform slices.

SUMMARY OF THE INVENTION

The preferred version of the invention includes a base configured to securely hold an egg or other soft food item, together with one or more slicing blades configured to slice an egg into two or more pieces. Although referred to as an egg slicer because it is particularly well-suited for slicing eggs, the present invention is also suitable for slicing other relatively soft food items such as mushrooms and fruits. For simplicity, the description that follows will refer to slicing eggs.

In one version, the base includes a concavity for holding the egg such that it will not roll away in the process of slicing. The concavity may be formed with a series of channels positioned to receive a slicing blade, thereby allowing the blade to fully pass through the egg.

In accordance with some versions, the slicing blades are configured to stack or nest with one another, and to nest in a secure position on the base for storage.

BRIEF DESCRIPTION OF THE DRAWINGS

Preferred and alternative examples of the present invention are described in detail below with reference to the following drawings.

DETAILED DESCRIPTION OF THE PREFERRED EMBODIMENT

Figure 1:
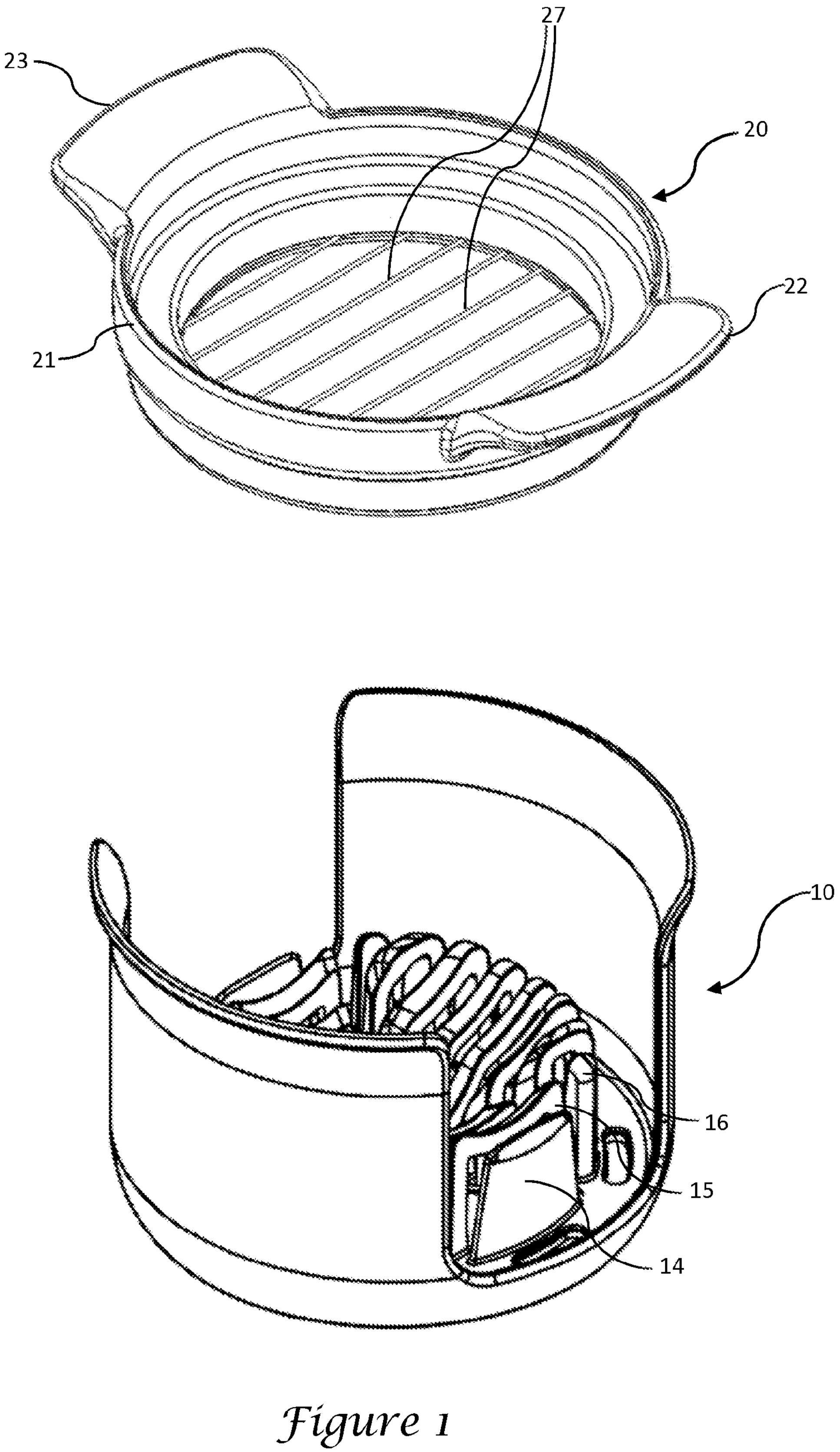
FIG. 1 is an exploded view of a preferred slicer and slicing base.
Figure 2:
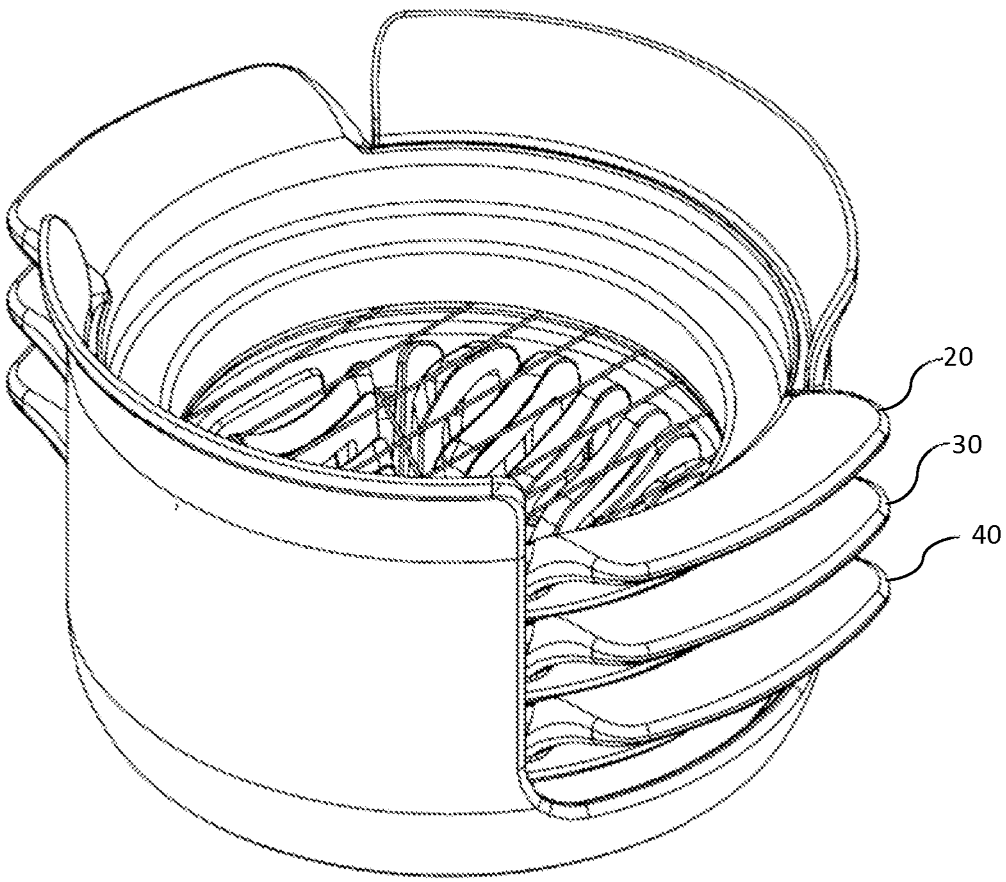
FIG. 2 is a perspective view showing a preferred slicing base and three preferred cutting elements stored within the base in a nesting fashion.
Figure 3:
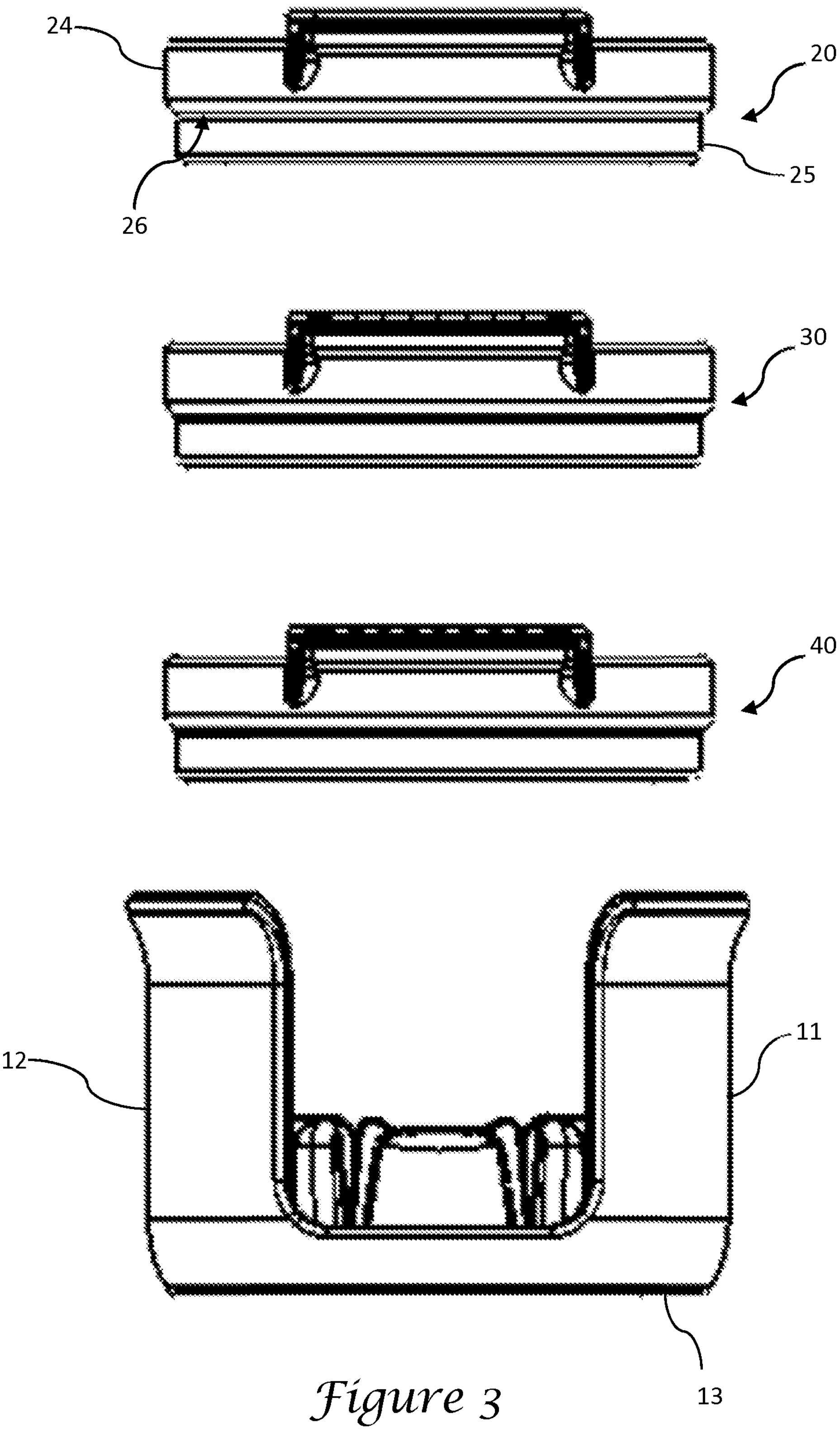
FIG. 3 is a front exploded view of the preferred slicing base and cutting elements as illustrated in FIG. 2.

As best seen in FIG. 1, the preferred version of the egg slicer includes a base and at least one cutting element 20. The cutting element 20 includes a peripheral frame 21 that preferably also includes diametrically opposed handles 22, 23 extending away from the interior of the frame. In versions in which the cutting element is configured to nest with other cutting elements, the frame preferably includes an upper portion 24 and a lower portion 25 (see FIG. 3), with one of the upper portion or the lower portion having a larger diameter than the other. Consequently, a shoulder 26 is provided at the intersection of the upper and lower portions of the frame to provide a seat to allow a frame from a first cutting element frame to rest upon a second cutting element frame such as is shown in FIG. 2. In the illustrated versions, the frame is circular, with the upper frame portion 24 having a diameter that is larger than that of the lower portion 25. The upper frame portion further has an internal diameter, and the internal diameter is sized to be able to receive within it the lower frame portion of a second cutting element. In other versions the frame may be square or any otherwise shaped in a non-circular fashion. Likewise, in other versions the frame is formed with a substantially uniform diameter, rather than in a stepped fashion, such that a first frame may simply rest atop a second frame instead of nesting partially within the second frame.

Figure 4:
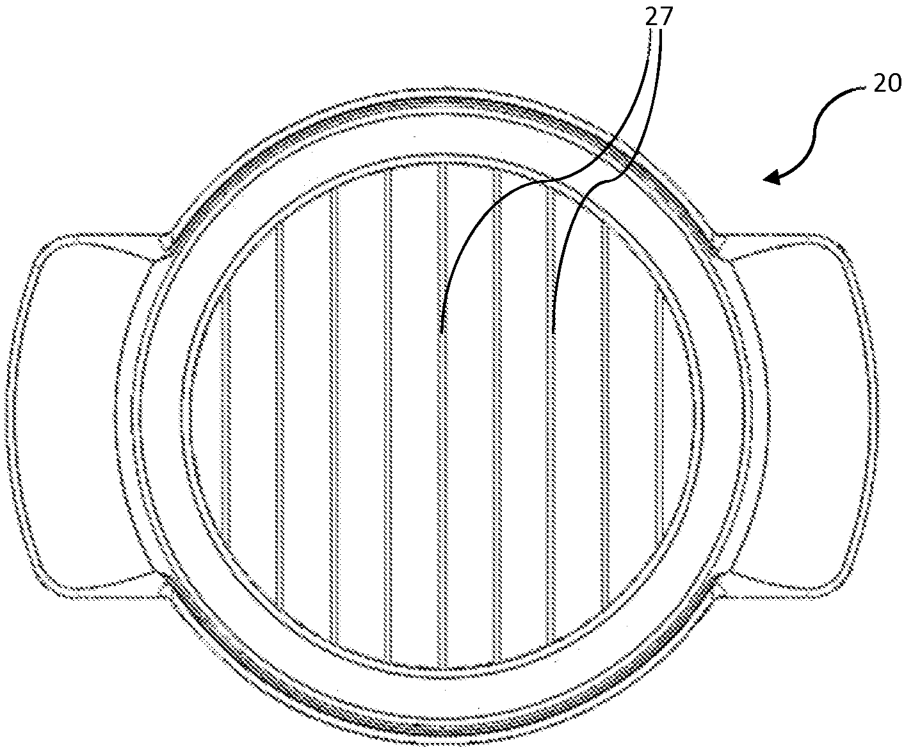
FIG. 4 is a top view of a preferred cutting element having wires for creating parallel slices.
Figure 5:
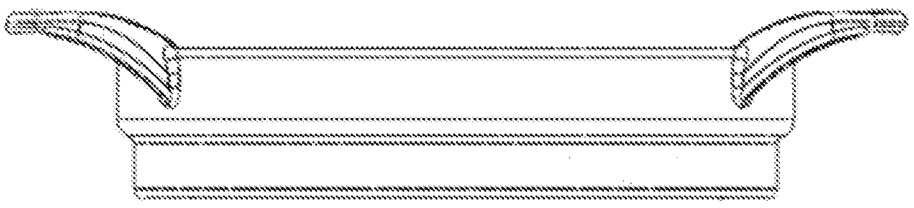
FIG. 5 is a front view of a preferred cutting element.

The cutting element includes one or more blades 27 extending across the interior region of the frame. In the case of the first cutting element 20 configured for slicing as shown in FIGS. 1 and 4, there is a series of cutting blades 27 positioned generally parallel to one another. In one version, eight parallel blades are provided, extending across the interior of the frame and positioned an equal distance apart from one another.

Figure 8:
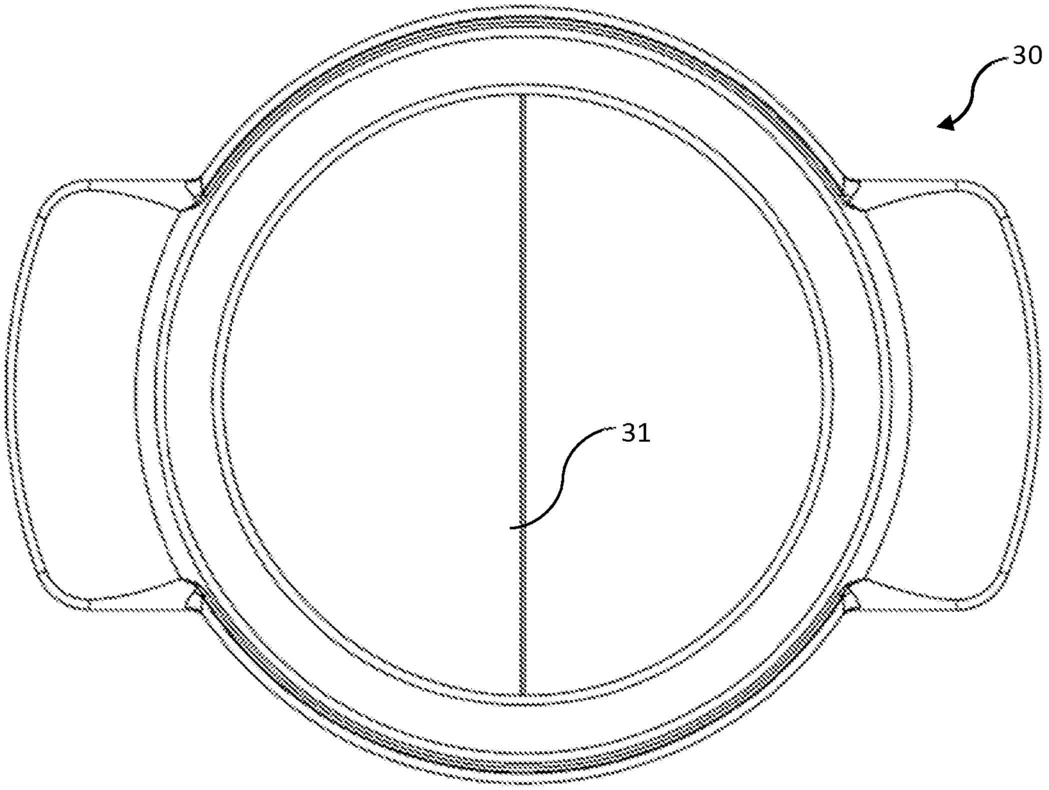
FIG. 8 is a top view of the preferred cutting element having a wire for cutting a food object in half.

A second cutting element 30 (see, for example, FIG. 8) may include a single blade 31 extending across the interior of the frame. Most preferably, the single blade will be positioned along a diameter of the circular frame.

A third exemplary cutting element 40 (see, for example, FIG. 6) may include a series of blades 41 that each pass through the diameter of the frame. Thus, in the illustrated version, the third cutting element includes three blades passing through the diameter, thereby forming wedge-shaped spaces between the blades.

It should be understood that any of the foregoing cutting elements may be used as either a first, second, or third cutting element, without regard to the particular order or label applied above. Likewise, yet other cutting elements may be provided with additional blades or having blades in different configurations. As illustrated, the different blade configurations will allow the cutting element to slice the egg or other food item into shapes generally matching the spaces between blades. In the case of the three cutting elements described above, the egg will be cut into slices, halves, or wedges.

The cutting blade may be formed in any manner that will produce an edge suitable for cutting through an egg. In the preferred version, the blade (e.g., 27, 31, 41) is formed as a thin metal wire with no actual sharpened edge. In other versions, the blades may be formed from metal, plastic, or other materials and may include a sharpened edge.

In the preferred version, the frame is formed from a plastic material, with the wires secured to the plastic such as by passing the wires through slots or channels in the frame, by molding the wire into the plastic frame, or by any other means.

The base 10 includes a lower foundation 13 that provides stable support for the base when resting on a horizontal surface such as a countertop. The lower foundation may be formed as a flat or planar component, or may have any number of feet.

The base preferably includes a pair of upwardly extending sidewalls 11, 12, creating a pair of openings between them. In the version as shown, the sidewalls are of equal height and width, and positioned diametrically opposite one another on the base. In other versions the size and positioning may be varied, but in such versions the size and positioning may affect the size or positioning of the handles 22, 23 formed on the frames, as noted below.

The openings formed between the sidewalls of the base are sized to receive the handles 22, 23 of the frames such that a portion of the handles may extend beyond the sidewalls forming the base. When a frame is in position on the base and pressed downward toward the bottom of the base, the complementary sizes of the handles and the openings serve to prevent rotational movement of the cutting elements within the base. Accordingly, the openings and sidewalls function as a guide to allow the cutting elements to be moved straight downward, along a central vertical axis through the base. Likewise, a preferred snug fit of the frames within the sidewalls and a height formed in the sidewalls 24 of the frame aids in keeping the frame parallel to the foundation of the base as it travels downward.

In other versions additional guides may be used instead of the opening formed to receive the handles. The handle and opening form of guide is preferred, however, in that it allows the peripheral flange to serve as both a handle and a guide at the same time.

Figure 9:
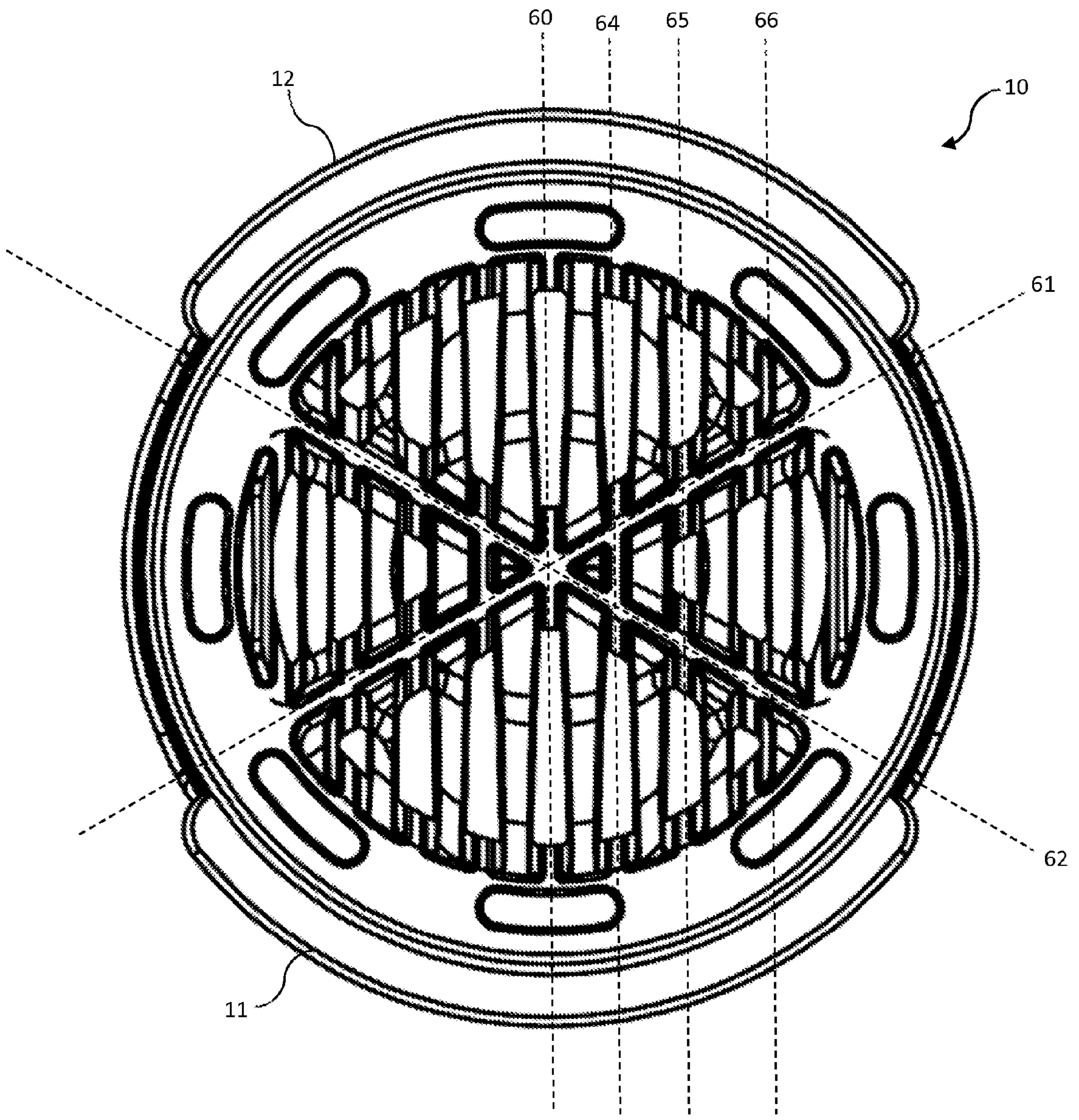
FIG. 9 is a top view of the slicing base and cutting elements as illustrated in FIG. 2.

The base further includes a series of ribs (for example, 14, 15, 16 in FIG. 1) extending upward from the bottom of the base, with a series of channels formed between the ribs (for example, 60, 61, 62 in FIG. 9). The ribs are preferably oriented such that they form channels that are positioned to receive the blades as the cutting elements are moved axially downward. Accordingly, in a base configured to accommodate the three different cutting elements described above, the base will include a series of parallel channels and several diameter channels that intersect one another to form wedge shapes. Thus, any of the several different cutting elements may be used with a single base because the base has channels oriented to receive the blades from all of them.

The upwardly extending ribs forming the channels have varying heights and upper surfaces that are sloped to form a central concavity, as illustrated in FIG. 1. Most preferably, the upper surfaces of the ribs form two distinct concavities, including a relatively smaller and steeper concavity at the center of the base that is shaped to hold a typically-sized egg in an upright position (that is, with the egg's longest axis extending vertically, upward from the base). The base also preferably includes a second concavity that has a larger outer perimeter than the first concavity. In a preferred version, the second concavity is formed such that it surrounds the first concavity. Thus, the upper surface of the ribs are formed with an outer bowl shape, further having an inner bowl having an upper surface that is lower than the outer bowl. The outer perimeter of the second concavity is preferably configured to receive a typical egg positioned perpendicular to the orientation from that of the first concavity, such that it can support an egg lying with its major axis parallel to the foundation of the base. Where two distinct concavities are included, the first concavity includes more steeply sloped sidewalls that then transition to a shallower sloping sidewall forming the second concavity.

Alternatively, the ribs within the base may include upper surfaces that slope at any angle to form a concavity at the middle of the base. In this regard, the slope may be linear or curved to form the concavity.

Figure 6:
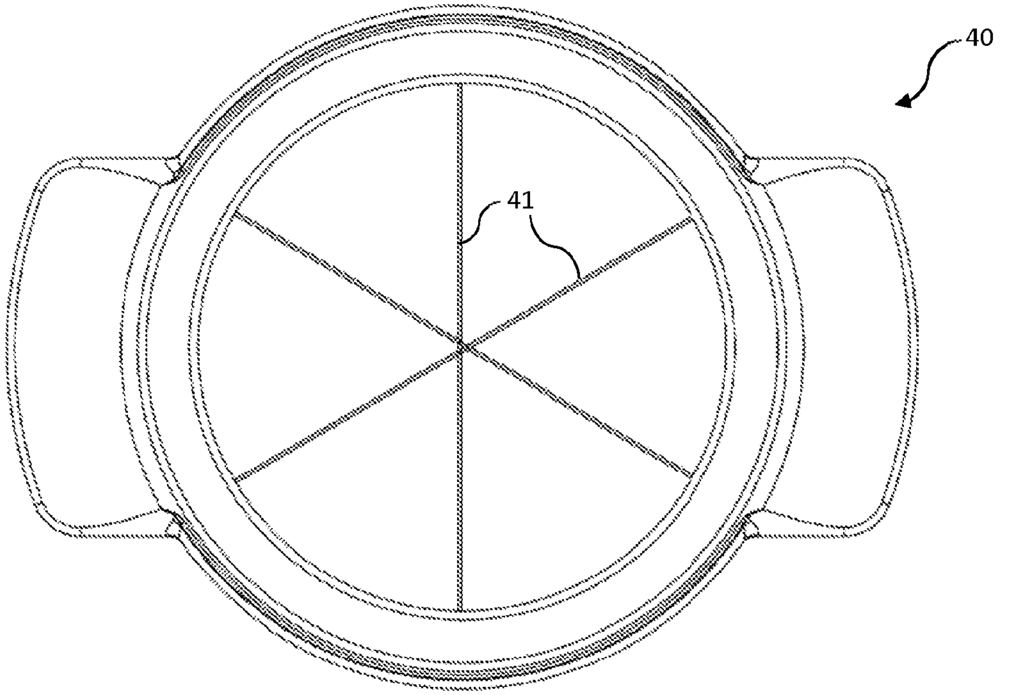
FIG. 6 is a top view of a preferred cutting element having wires for creating wedges.
Figure 7:
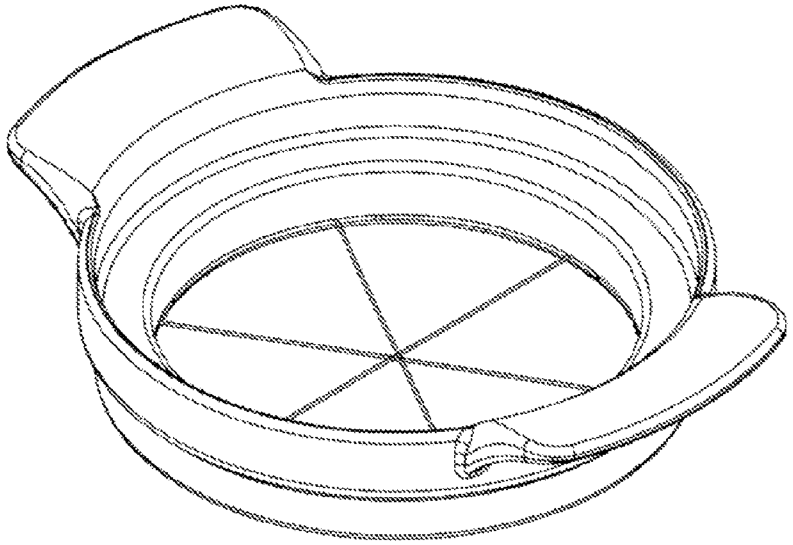
FIG. 7 is a perspective view of the cutting element of FIG. 6.

As best seen in FIG. 9, the base 10 is formed with a plurality of ribs that are arranged to define several channels formed between the ribs. The channels are arranged so that they will receive the wires were cutting blades of the cutting elements, as described above. Thus, three channels 60, 61, 62 are formed such that they intersect at the center of the base and are positioned along diameters of the base. In the illustrated example, the channels are positioned along equally spaced radials, thereby creating wedge shapes between the channels, with the wedge shapes each being shaped the same as one another. In the preferred version, three channels are formed along diameters the base to thereby create groupings of ribs forming six wedge shapes. The diametric channels 60, 61, 62 are therefore configured to receive the cutting blades from the wedge cutting element as illustrated in FIGS. 6 and 7.

In addition, a plurality of parallel channels are formed in the ribs of the base. For example, several parallel channels defined along axes 60, 64, 65, 66 are formed in the ribs of the base such that each of the channels is parallel to a diameter of the base 60 and spaced apart equally from one another toward the perimeter of the base. For simplicity, in FIG. 9 the axes for only three parallel channels are labeled, although should be understood that any number of parallel channels may be formed in the ribs of the base in order to accommodate a slicing element having a corresponding number of blades. Most preferably, the base 10 includes a number of channels corresponding to the number of blades 27 formed in the parallel slicing element 20 as illustrated in FIG. 4. Thus, in use, each of the parallel slicing blades 27 may be pressed downward into the base to be received within the channels defined along the parallel axes 60, 64, 65, 66 (and additional channels not labeled).

In use, an egg (or other food item) is placed atop the ribs, where it is held in place by the concave surface at the upper ends of the ribs. Then the user selects a desired cutting element and presses the cutting element downward toward the egg. The outer edges of the cutting element frame may abut the interior of the sidewalls of the base. Likewise, the handles of the frame will be snugly received within the openings between the sidewalls to guide the cutting element straight downward. The channels formed between the ribs within the base allow the blades to be received within the channels so that the blades can completely pass through the egg.

For storage, multiple cutting elements can be positioned within the sidewalls of the base. As described above, the frames are preferably configured to nest within one another while the several different cutting blades can be positioned within the channels between the ribs.

Although the varied frame sizes of the cutting members allow for efficient nesting for storage, in other versions the frames are not sized and configured for nesting, but rather are sized to allow one cutting member to rest atop another for storage.

While the preferred embodiment of the invention has been illustrated and described, as noted above, many changes can be made without departing from the spirit and scope of the invention. Accordingly, the scope of the invention is not limited by the disclosure of the preferred embodiment. Instead, the invention should be determined entirely by reference to the claims that follow.

The embodiments of the invention in which an exclusive property or privilege is claimed are defined as follows:

1. An egg slicer, comprising:

a base having a lower foundation and a plurality of ribs extending upward from the lower foundation, the plurality of ribs defining a first plurality of channels extending diametrically across the base and intersecting one another at a common location at a middle of the base, and the plurality of ribs defining a second plurality of channels extending across the base and being configured to be parallel to one another; and a first cutting element having a first frame and a first plurality of blades extending across the first frame, the first plurality of blades being configured to be received within one of the first or second pluralities of channels when the first cutting element is pressed downward against the base.

2. The egg slicer of claim 1, wherein the base further comprises a first sidewall and an opposing second sidewall, each of the first sidewall and the second sidewall extending upward from the foundation such that the ribs are positioned within a space defined between the first sidewall and the second sidewall, the first and second sidewalls further defining a first opening and a second opening between the first and second sidewalls.

3. The egg slicer of claim 2, wherein the first frame is configured to fit within the space defined between the first and second sidewalls, the first frame further comprising a first pair of handles extending laterally away from the first frame, each of the first pair of handles being sized and configured to extend through a respective one of the first and second openings when the first cutting element is pressed downward against the base.

4. The egg slicer of claim 3, wherein the first and second openings are sized and configured to guide the first pair of handles along a vertical path when the first cutting element is pressed downward toward the base.

5. The egg slicer of claim 3, further comprising a second cutting element having a second frame and a second plurality of blades extending across the second frame, the second plurality of blades being configured to be received within one of the first or second pluralities of channels when the first cutting element is pressed downward against the base.

6. The egg slicer of claim 5, wherein the first plurality of blades of the first cutting element are configured to be received within the first plurality of channels, and further wherein the second plurality of blades of the second cutting element are configured to be received within the second plurality of channels.

7. The egg slicer of claim 6, wherein the second frame is configured to fit within the space defined between the first and second sidewalls, the second frame further comprising a second pair of handles extending laterally away from the second frame, each of the second pair of handles being sized and configured to extend through a respective one of the first and second openings when the second cutting element is pressed downward against the base.

8. The egg slicer of claim 7 wherein one of the first frame or the second frame is configured to nest within the other of the first frame or the second frame when the first slicing element and the second slicing element are both pressed downward against the base.

9. The egg slicer of claim 5, further comprising a third cutting element having a third frame and a third blade extending across the third frame, the third blade being configured to be received within one of the first or second pluralities of channels when the third cutting element is pressed downward against the base.

10. The egg slicer of claim 5, wherein the plurality of ribs comprises an upper surface having a first concavity.

11. The egg slicer of claim 10, wherein the upper surface of the plurality of ribs further comprises a second concavity, the second concavity being positioned within an interior of the first concavity and being deeper than the first concavity.

12. An egg slicer, comprising:

a base having a lower foundation and a support structure extending upward from the lower foundation;

the support structure having a first plurality of channels extending diametrically through the support structure and intersecting one another at a common location at a middle of the support structure to define a plurality of wedge-shaped supports between adjacent ones of the first plurality of channels;

the support structure further having a second plurality of channels extending across the support structure and positioned parallel to one another to define a plurality of elongated supports between adjacent ones of the second plurality of channels;

wherein portions of the first plurality of channels intersect portions of the second plurality of channels;

a first cutting element having a first frame and a first plurality of blades extending across the first frame, the first plurality of blades being configured to be received within the first plurality of channels when the first cutting element is pressed downward against the base; and a second cutting element having a second frame and a second plurality of blades extending across the second frame, the second plurality of blades being configured to be received within the second plurality of channels when the second cutting element is pressed downward against the base.

13. The egg slicer of claim 12, wherein the base further comprises a first sidewall and an opposing second sidewall, each of the first sidewall and the second sidewall extending upward from the foundation such that the support structure is positioned within a space defined between the first sidewall and the second sidewall, the first and second sidewalls further defining a first opening and a second opening between the first and second sidewalls, and the first frame and the second frame being positionable within a space defined between the first and second sidewalls and the support structure when the first frame and the second frame are pressed downward against the base.

14. The egg slicer of claim 13, wherein the first frame further comprises a first pair of handles extending laterally away from the first frame and the second frame further comprises a second set of handles extending laterally away from the second frame, each of the first pair of handles and each of the second pair of handles being sized and configured to extend through one of the first and second openings when the first cutting element is pressed downward against the base.

15. The egg slicer of claim 14, wherein the first and second openings are sized and configured to guide the first pair of handles along a vertical path when the first cutting element is pressed downward toward the base.

16. The egg slicer of claim 14 wherein one of the first frame or the second frame is configured to nest within the other of the first frame or the second frame when the first slicing element and the second slicing element are both pressed downward against the base.

17. The egg slicer of claim 14, wherein the support structure comprises an upper surface having a first concavity.

18. The egg slicer of claim 14, wherein the upper surface of the support structure further comprises a second concavity, the second concavity being positioned within an interior of the first concavity and being deeper than the first concavity.

* * * * *